Jan. 13, 1970  E. L. KELLS ET AL  3,489,133
FLAT-COOKING APPARATUS
Filed Feb. 28, 1968  2 Sheets-Sheet 1
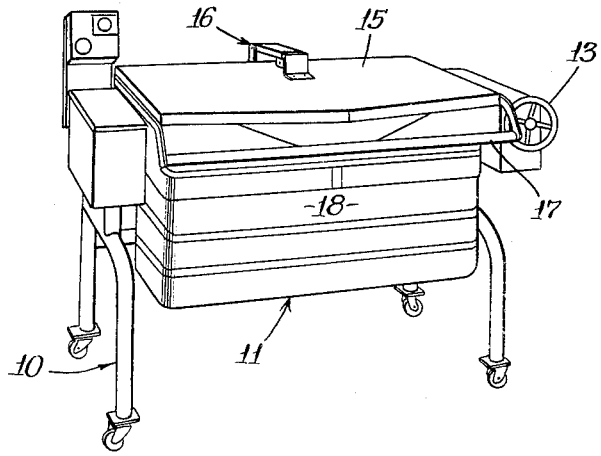
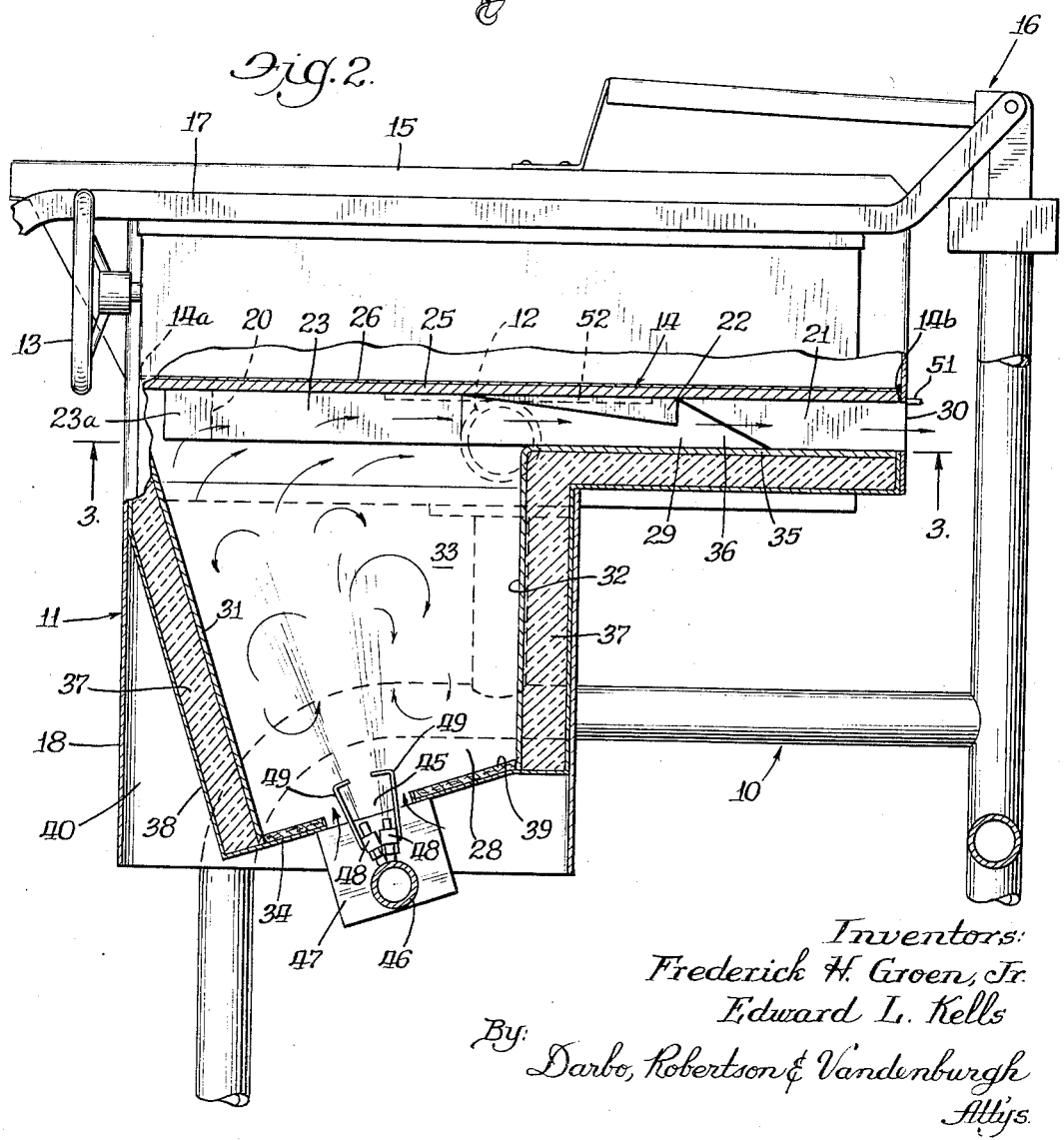
Inventors:
Frederick H. Groen, Jr.
Edward L. Kells
By: Darbo, Robertson & Vandenburgh
Attys.

United States Patent Office 3,489,133
Patented Jan. 13, 1970

3,489,133
FLAT COOKING APPARATUS
Edward L. Kells, Batavia, and Frederick H. Groen, Jr., River Forest, Ill., assignors to Dover Corporation, New York, N.Y., a corporation of Delaware
Filed Feb. 28, 1968, Ser. No. 709,015
Int. Cl. F24c *3/00, 15/10*
U.S. Cl. 126—39       22 Claims

ABSTRACT OF THE DISCLOSURE

A flat cooking plate has a plurality of tabs extending downwardly adjacent the front of the plate; a plurality of closely spaced downwardly extending fins adjacent the rear of the plate; a plurality of less closely spaced downwardly extending fins forwardly of the rear fins; and forwardly of the latter are downwardly extending fins adjacent each end of the plate. Below approximately the front half of the plate is a combustion chamber. Communicating with the combustion chamber and extending rearwardly therefrom below the remainder of the plate is a passageway open at the back. The combustion chamber is relatively deep as compared to the depth of the passageway. At the bottom of the combustion chamber are a plurality of gas burners extending the length of the combustion chamber in approximately the front-to-back center thereof.

BRIEF SUMMARY OF THE INVENTION

The present invention relates to the combination of a flat cooking plate which may be a griddle or the bottom of a pan, and a gas heating apparatus therefor which will give a high rate of heat transfer to the food products above the plate while at the same time providing a uniformity of heating to prevent burning of the products in any area thereof and at a high efficiency of heat utilization.

BACKGROUND OF THE INVENTION

The present invention pertains solving problems present in large kitchens where food is prepared in quantity, such as large hotels, restaurants, airline kitchens, kitchens where quantities of food are prepared for packaged frozen product, etc. Here they will be performing the usual cooking processes such as frying or cooking on a griddle, braising, cooking large quantities of vegetables, etc. Griddles, fry pans and other hot metal surfaces are used for the heating of foods distributed over the exposed cooking surface as solids, liquids or slurries.

Foods, of course, are heat degradable and often will undesirably decompose at temperatures only slightly above the desired peak process temperature. Consequently, if some portions of the cooking surface are significantly hotter than other portions, the product on the hotter spots will be degraded before that on the cooler spots is finished. At the same time, because of production problems, it is desired to work at about a peak processing temperature and introduce heat into the product as rapidly as possible so as to achieve maximum production in the shortest possible time.

Flame heated griddles, fry pans and kettles have been notorious for hot spotting. Two main approaches have been used in the prior art in an effort to overcome this problem. One has been to make the plates forming the cooking surface very thick so that lateral conduction through the plate will tend to equilibrate the temperatures throughout the plate, even though the heat input on the flame side is far from uniform over the plate. This approach has the disadvantages that (1) the thick plate is slow to warm up at the start and (2) that there is substantial lag between the heat being transferred to the product and the heat input at such times as it is desired to make changes in the processing temperature. Furthermore, by making the heat transfer vertically through the plate inherently slow (because of the substantial thickness) excessive heat is likely to be present at the bottom of the plate at those times when comparatively high cooking temperatures are employed at the top of the plate. Such thick plates are heavy and expensive.

A second solution that has been prominently employed is to more or less uniformly distribute the flame over the bottom of the plate. This requires a large, expensive burner with an overall low intensity flame. It results in the exhaust gas travel being much longer over the plate from the flame in the front or center of the plate (remote from the exhaust) than from the flame near the rear or vent. This difference in exhaust gas travel inescapably results in a low thermal efficiency system. The exhaust gas washing over the underside of the plate from the burners farthest from the vent actually serves as an insulator in those areas nearest the vent so that the burners at the latter location are actually heating the plate less than are the burners where the burner flames are not separated from the plate by the already cooled exhaust gases from other areas.

It is an object of this invention to provide a combination of a relatively thin plate with a gas heating device therefor which will give superior temperature distribution over the cooking surface of the plate. At the same time the combination which we have devised will permit high rates of heat input and usable output so that the apparatus is generally fast and of high performance. As a corollary, the devised combination has a high rate of thermal utilization and wastes to the stack only a small portion of heat produced by the gas combustion. By utilizing a relatively thin plate, as compared to some prior art devices, the cooking surface is readily responsive to changes in heat input. Thus, if the gas burner is turned up or down to achieve a desired change in cooking temperature, the change in temperature is reflected comparatively promptly at the surface exposed to the food being cooked. Another object and advantage of the invention is to provide a cooking apparatus which can be used at relatively high cooking temperatures without having the external portions of the apparatus at a temperature that will make it uncomfortable for the cook to be near. Further objects and advantages will be apparent from the following description taken in conjunction with the drawings.

DESCRIPTION OF THE DRAWINGS

FIGURE 1 is a perspective view of an embodiment of the invention;

FIGURE 2 is an enlarged end view of the main part of the apparatus of FIGURE 1 with portions broken away.

DESCRIPTION OF A SPECIFIC EMBODIMENT

Figure 3:
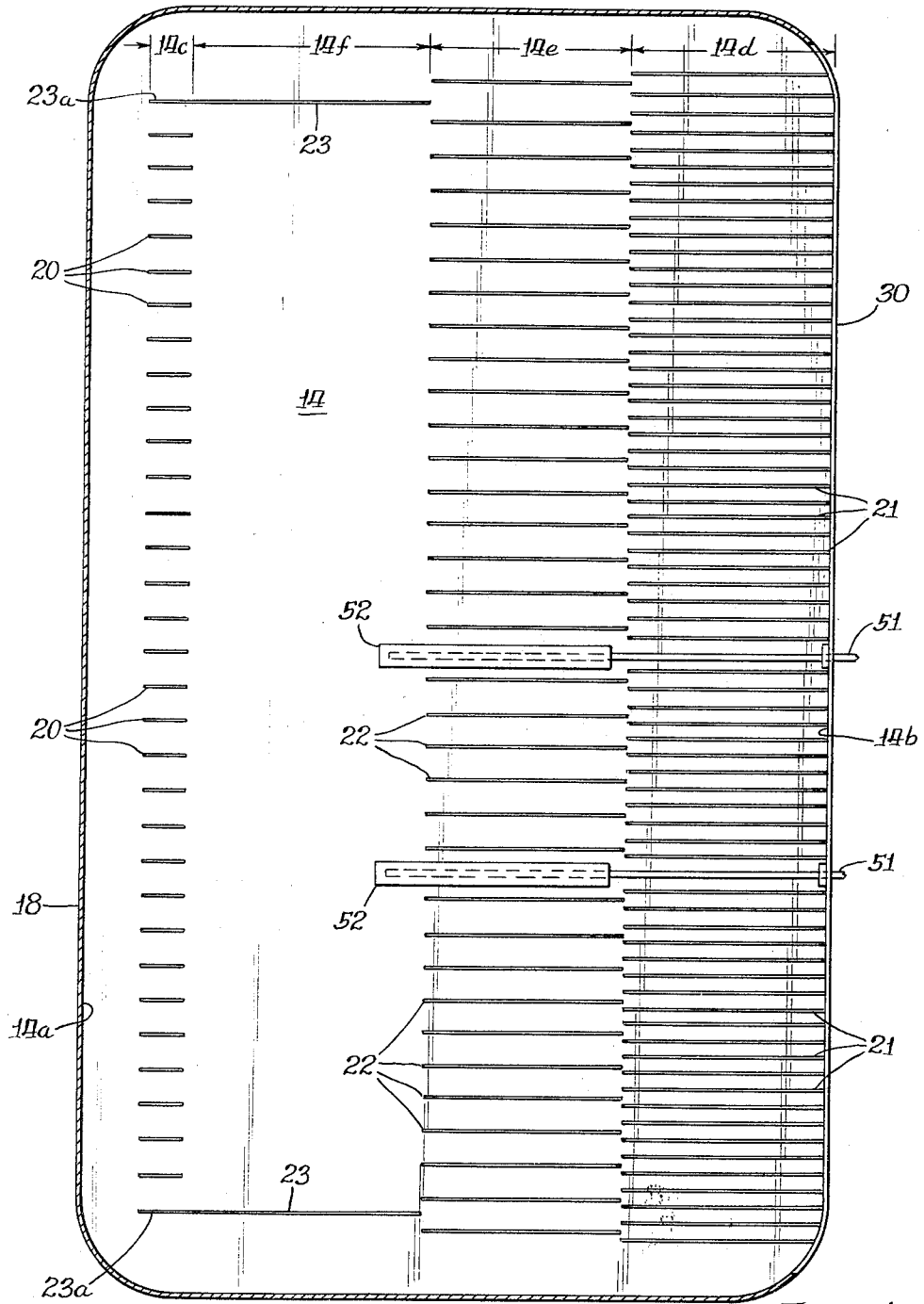
FIGURE 3 is a horizontal section as viewed at line 3—3 of FIGURE 2.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

FIGURE 1 illustrates a cooking apparatus in the form of a pan which alternatively may be used for frying, braising, as a griddle, pot, etc. It is intended for use under an exhaust hood or the like which will remove the exhaust gases of combustion rising to the upper part of the room from the discharge outlet of the apparatus, hereinafter described. It is not necessary to directly connect it to a chimney or stack which would provide a draft for the combustion apparatus. This draft is inherently produced in the apparatus itself by the described construction. If desired, a stack connection could be provided.

The disclosed embodiment includes a frame generally 10 which is mounted on casters 11 so that it may be easily moved about to facilitate its use. The cooking unit generally 11 has trunnions 12 (FIG. 2) extending from the ends thereof which trunnions are journaled in bearings, not shown, in frame 11 so that the cooking unit can be rotated about a horizontal axis (defined by the trunnions) relative to the frame. On one of the trunnions is a mechanism, not shown in detail, connected to hand wheel 13 by which the rotational position of the cooking unit with respect to the frame may be controlled. This enables the user to tip the cooking unit for the emptying of the pan thereof, for example. Normally, the cooking surface will be positioned horizontally when in use.

The pan is defined by cooking plate 14 and the sidewalls extending thereabove. It is of course open at the top and provided with a cover 15. Connected to the cover is a counterbalance mechanism generally 16 and a handle 17 to permit the user to easily raise and lower the cover. The cooking unit is surrounded by a shroud 18 which at the top forms the sidewalls of the pan. Preferably the shroud is of stainless steel, as are the other exposed surfaces of the apparatus.

The cooking plate 14 has a front 14a and a rear 14b. Extending downwardly along a first area 14c adjacent the front 14a of the plate are a plurality of fins 20 in the form of tabs. Along a second area 14d adjacent the rear of the plate are a plurality of downwardly extending fins 21. Along a third area, forwardly of the second area are a third set of downwardly extending fins 22. Between the first and third areas there are fins 23. The fins 23 have forwardly extending portions 23a which, in function, correspond to the row of tabs 20.

Referring to FIGURES 2 and 3, it will be seen that fins 21 are relatively large and closely spaced providing a comparatively large exposed fin surface in relation to the size of the second area 14d. Fins 22 are substantially smaller and more widely spaced so that the exposed fin surface in relation to the area 14e is comparatively smaller. The fins 20 (including 23a) likewise are smaller in surface in relation to the area 14c than is the ratio of area of fins 21 to area 14d. The fins are affixed to the bottom of plate 14 and in thermal conductive relationship thereto. Thus, in area 14d there is a comparatively large surface for heat pickup from the gases of combustion. In area 14e there is substantially less surface exposed per unit of cooking area for the pickup of heat from the gases of combustion. In area 14f there are no fins except adjacent the ends where fins 23 are provided to insure warmth about the ends of the plate in that area. Fins 20 provide additional heat pickup adjacent the front 14a of the plate to make sure that the front of the plate does not run cold. For maximum efficiency, fins 21 extend to the bottom of passageway 29.

In a specific embodiment wherein the plate 14 has a front to back dimension of 24 inches, the fins 20 are 1.5 by 1.5 inches and are positioned on 1.0 inch centers. The front of fins 20 are 1.75 inches from the front 14a of the plate. Fins 21 are an inch and one-half deep with a top length of 6.5 inches and a bottom length of 4.0 inches. Fins 22 are 6.5 inches long at the top and have a depth at the back thereof of 0.75 inch. Fins 21 are on 0.5 inch centers while fins 22 are on 1.0 inch centers. To indicate the comparative surface of fins per unit of plate area, fins 20 are in the range of approximately 60% as great as the ratio of fin surface to plate area presented by fins 21 while 22 are in the range of approximately 15% of the ratio present with respect to fins 21. Actually, of course, these figures are not exact by any means because they do not take into account the triangular configurations of fins 21 and 22 which result in more heat pickup in one area of the fins than in another. The important point is that there are large exposed areas for heat pickup adjacent the rear of the plate, substantially smaller surfaces for heat pickup in the plate area 14e, even smaller surfaces (substantially only the bottom of the plate itself) for heat pickup in the area 14f, increased surfaces for heat pickup adjacent the front of the plate (area 14c). Adjacent the ends of the plate there is some supplementation in the area 14f.

The plate 14 is formed of a carbon steel bottom layer 25 with a thin overlay 26 of stainless steel. It is essential that the stainless steel overlay 26 be bonded in solid mechanical and thermal contact with the bottom layer 25. This can be done by a hot rolling process. In an embodiment where the total thickness of plate 14 is $\frac{3}{8}$ of an inch, the carbon steel bottom layer is $\frac{5}{16}$ in thickness and the stainless layer is $\frac{1}{16}$ inch in thickness.

Below the cooking plate 14 are walls which (with the plate) define a combustion chamber 28 and a communicating passageway 29. These extend the length of plate 14. Passageway 29 has an outlet 30 through which the products of combustion are discharged. These walls include a front wall 31 of the combustion chamber, a rear wall 32, ends 33 and bottom 34 of the combustion chamber; and bottom 35 and ends 36 of passageway 29. These walls are covered with a thermal insulation 37 held in place by an outer wall such as 38. A layer of insulation 39 is applied over the top of the bottom wall 34 of the combustion chamber. The front wall 31, 37, 38 of the combustion chamber slants downwardly and toward the rear. This provides a space 40 between that wall and the shroud 18 so that that part of the shroud will remain relatively cool. This greatly increases the comfort of a person working in front of the cooking unit. In some embodiments, a vertically movable shutter (not shown) is provided at discharge opening 30 for controlling the flow of gases therethrough to obtain optimum combustion.

The bottom of wall 31 is substantially lower than the bottom of wall 32 so that the bottom 34 of the combustion chamber slants upwardly and to the rear. Approximately in the front-to-back middle of the bottom wall 34 is an opening 45 which extends the length of the combustion chamber. Below opening 45 is a gas pipe 46 held by a pair of end plates 47 secured to bottom 34. Mounted on gas pipe or manifold 46 are a plurality of small Bunsen burners 48. These, for example, are burners No. 651 (without cap) made by Barber Manufacturing Company. For a plate 14 which is 41 inches in length, 35 such burners are used, positioned on 1.0 inch centers. Along the length, alternate burners are slanted first somewhat forwardly and next somewhat rearwardly. Affixed to and extending upwardly from each burner is a $\frac{3}{16}$ inch diameter rod 49 in the form of an inverted L. Each rod is over and serves as a flame holder for the respective burner.

Suitable controls are provded by which the flame size and temperature can be regulated. Of this, all that is illustrated are two thermostat sensors 51 recessed in grooves in the bottom of plate 14. The inner ends of these sensors have metal covers 52 thereover with the remainder of the sensors being exposed. These sensors in part sense the temperature of plate 14 and in part sense the temperature of the combustion gases. They are tied into the automatic controls for regulating the gas flow. A pilot light (not shown) also is provided.

The burners 48 direct a flame upwardly and toward the frontal area of plate 14. The most forwardly directed set of burners are angled directly towards area 14c of the plate. Certain proportions of the combustion chamber 28, in relation to the burner flame, are important to the correct operation of the device. In the first place it is necessary that the flame front be no closer than 5 inches to the bottom of plate 14. In the illustrated embodiment the combustion chamber has a maximum depth of 14 inches and the distance between the flame front and the bottom of the plate will be substantially greater than 5 inches. This is to promote uniformity of heat distribution and to insure the production of a good draft upwardly through the combustion chamber and out through passageway 29 (no other means of draft promotion being employed).

Secondly the combustion chamber should have a width significantly in excess of the flame width so that there is a space between the sides of the flame and the walls of the combustion chamber. This promotes a whirling air circulation as illustrated in FIGURE 2 to keep the walls of the combustion chamber cool as compared to the situation that would exist were such a gaseous circulation in the chamber not achieved. This coolness is important, not only to minimize heat loss and decrease uncomfortable heat radiation, but it also produces a more readily responsive cooking apparatus. That is, with the walls of the combustion chamber running comparatively cool the temperature of plate 14 is more rapidly responsive to changes in flame size than would be the case if the combustion chamber were hotter so that when the burner was turned down radiant heat from the walls would continue to affect the temperature of plate 14.

The relationship of the front-to-back length of passageway 29 as compared to the front-to-back length of the combustion chamber also is important. Thus, the front-to-back length of the combustion chamber should be between 0.25 and 0.66 of the total front-to-back length (14a to 14b) of the plate 14. In the illustrated embodiment the front-to-back length of the combustion chamber (at the top) is 11⅜ inches for a 24 inches plate width. Also the depth of passageway 29 must be comparatively small in relationship to the depth of combustion chamber 28. In no event should the depth of the passageway (the distance between plate 14 and wall 35) exceed 40% of the maximum depth of the combustion chamber. In the illustrated embodiment the passageway 29 has a depth of 1.50 inches. In some embodiments passageway 29 has a greater depth at the front (combustion chamber) end than at the discharge opening 30 end. In that event the average height of the passageway 29 should be no greater than 40% of the maximum combustion chamber depth. If the passageway 29 is too deep, the hot gases are not held against the bottom of plate 14, there is inadequate velocity of the flow of gases across the fins and plate bottom, and the height of the fins create a situation in which there is an unreasonable lag in heat transfer therethrough. The minimum depth of the passageway is dictated by the necessity for having adequate draft for combustion purposes. In general it should not be less than 0.2 inch per 1,000 B.t.u.'s of combustion per hour per inch of length between walls 36.

We claim:

1. In a cooking apparatus comprising an approximately horizontal, approximately flat plate to be heated and forming a cooking surface, said plate having a front and a back, and a device to heat said plate, the improvement comprising:

walls extending downwards and across below said plate and defining a combustion chamber communicating with an exhaust passageway, said chamber and passageway extending the length of said plate with the top of the chamber and passageway being defined by said plate, said chamber being below a first portion of the plate extending rearwardly from the front thereof and the passageway being below the remaining portion of the plate from the first portion to the rear of the plate, said chamber having a given depth below said plate, said passageway having a depth below said plate substantially less than said given depth, said chamber having space at the bottom to receive said device and being substantially unobstructed between said space and said plate;

heat transfer means in heat conductive relationship with the bottom of the plate and extending downwardly therefrom for increasing the heat transfer from the gases in the chamber to specific parts of the plate for rendering the temperature of the plate more uniform particularly at the front, rear and ends of the plate; and said device including gas burner means in said space for producing a flame in the chamber and extending approximately the length thereof, which flame is spaced from the plate and has sides spaced from the forward and back sides of the chamber whereby gases can circulate in the chamber at the front and back sides of the flame between the flame and the chamber walls, said burner means directing said flame toward the area of the plate adjacent the front thereof.

2. In an apparatus as set forth in claim 1, wherein the front to back dimension of said first portion of said plate is between 0.25 and 0.66 of the front to back dimension of said plate.

3. In an apparatus as set forth in claim 2, wherein the vertical depth of said passageway is no greater than 40 percent of the depth of said chamber.

4. In a cooking apparatus comprising an approximately horizontal, approximately flat plate to be heated and forming a cooking surface, said plate having a front and a back, and a device to heat said plate, the improvement comprising:

walls extending downwards and across below said plate and defining a combustion chamber communicating with an exhaust passageway, said chamber and passageway extending the length of said plate with the top of the chamber and passageway being defined by said plate, said chamber being below a first portion of the plate extending rearwardly from the front thereof and the passageway being below the remaining portion of the plate from the first portion to the rear of the plate, said chamber having a given depth below said plate, said passageway having a depth below said plate substantially less than said given depth, the front to back dimension of said first portion of the plate being between 0.25 and 0.66 of the front to back dimension of said plate, the vertical depth of said passageway being no greater than 40 percent of the depth of said chamber;

heat transfer means in heat conductive relationship with the bottom of the plate and extending downwardly therefrom for increasing the heat transfer from the gases in the chamber to specific parts of the plate for rendering the temperature of the plate more uniform particularly at the front, rear and ends of the plate, said heat transfer means including a plurality of downwardly extending first metallic members under a first area of the plate adjacent to the front of said plate, a plurality of downwardly extending second metallic members under a second area of the plate adjacent the rear edge of said plate, and a plurality of downwardly extending third metallic members under a third area of the plate to the front of said second members, said third metallic members having an exposed surface substantially smaller in proportion to said third area than is the ratio of the exposed surface of the second metallic members to said second area, said first metallic members having an exposed surface substantially smaller in proportion to said first area than is the ratio of the exposed surface of the second members to said second area; and
gas burner means adjacent the bottom of the chamber for producing a flame in the chamber and extending approximately the length thereof, which flame is spaced from the plate and has sides spaced from the forward and back sides of the chamber whereby gases can circulate in the chamber at the front and back sides of the flame between the flame and the chamber walls, said burner means directing said flame toward the area of the plate adjacent the front thereof.

5. In an apparatus as set forth in claim 4, wherein said members are fins positioned approximately parallel to a line representing the front-to-back dimension of the plate; and including fins adjacent each end of the plate in a fourth area extending approximately from said first area to said third area with the fourth area between said first area and said third area being otherwise generally free of downwardly extending heat transfer means, said fourth area being approximately centered on said chamber.

6. In an apparatus as set forth in claim 5, wherein the wall forming the front of the chamber slants downwardly and rearwardly, the wall forming the back of the chamber is approximately vertical with the bottom thereof being above the bottom of said front wall of the chamber, and the wall forming the bottom of the chamber slants upwardly and rearwardly from the bottom of the front wall to the bottom of the rear wall, said bottom of the chamber having an opening therethrough approximately in the front-to-back middle thereof which opening extends approximately the length of the chamber for the admission of secondary air, said burner means being directed upwardly through said opening and generally toward said first area of the plate.

7. In an apparatus as set forth in claim 6, wherein said plate is relatively thin, that is, less than 0.5 inch, and comprises a bottom layer of carbon steel with a top layer of stainless steel in solid mechanical and thermal contact with each other, said top layer being quite thin in comparison with said bottom layer.

8. In an apparatus as set forth in claim 6, wherein said second set of members extend to the bottom of said passageway.

9. In a cooking apparatus comprising an approximately horizontal, approximately flat plate to be heated and forming a cooking surface, said plate having a front and a back, and a device to heat said plate, the improvement comprising:

walls extending downwards and across below said plate and defining a combustion chamber communicating with an exhaust passageway, said chamber and passageway extending the length of said plate with the top of the chamber and passageway being defined by said plate, said chamber being below a first portion of the plate extending rearwardly from the front thereof and the passageway being below the remaining portion of the plate from the first portion to the rear of the plate, said chamber having a given depth below said plate, said passageway having a depth below said plate substantially less than said given depth;

heat transfer means in heat conductive relationship with the bottom of the plate and extending downwardly therefrom for increasing the heat transfer from the gases in the chamber to specific parts of the plate for rendering the temperature of the plate more uniform particularly at the front, rear and ends of the plate, said heat transfer means including
a plurality of downwardly extending first metallic members under a first area of the plate adjacent to the front of said plate,
a plurality of downwardly extending second metallic members under a second area of the plate adjacent the rear edge of said plate, and
a plurality of downwardly extending third metallic members under a third area of the plate to the front of said second members,
said third metallic members having an exposed surface substantially smaller in proportion to said third area than is the ratio of the exposed surface of the second metallic members to said second area,
said first metallic members having an exposed surface substantially smaller in proportion to said first area than is the ratio of the exposed surface of the second members to said second area; and
gas burner means adjacent the bottom of the chamber for producing a flame in the chamber and extending approximately the length thereof, which flame is spaced from the plate and has sides spaced from the forward and back sides of the chamber whereby gases can circulate in the chamber at the front and back sides of the flame between the flame and the chamber walls, said burner means directing said flame toward the area of the plate adjacent the front thereof.

10. In an apparatus as set forth in claim 9, wherein said members are fins positioned approximately parallel to a line representing the front-to-back dimension of the plate; and including fins adjacent each end of the plate in a fourth area extending approximately from said first area to said third area with the fourth area between said first area and said third area being otherwise generally free of downwardly extending heat transfer means, said fourth area being approximately centered on said chamber.

11. In an apparatus as set forth in claim 10, wherein the wall forming the front of the chamber slants downwardly and rearwardly, the wall forming the back of the chamber is approximately vertical with the bottom thereof being above the bottom of said front wall of the chamber, and the wall forming the bottom of the chamber slants upwardly and rearwardly from the bottom of the front wall to the bottom of the rear wall, said bottom of the chamber having an opening therethrough approximately in the front-to-back middle thereof which opening extends approximately the length of the chamber for the admission of secondary air, said burner means being directed upwardly through said opening and generally toward said first area of the plate.

12. In a cooking apparatus comprising an approximately horizontal, approximately flat plate to be heated and forming a cooking surface, said plate having a front and a back, and a device to heat said plate, the improvement comprising:

walls extending downwards and across below said plate and defining a combustion chamber communicating with an exhaust passageway, said chamber and passageway extending the length of said plate with the top of the chamber and passageway being defined by said plate, said chamber being below a first portion of the plate extending rearwardly from the front thereof and the passageway being below the remaining portion of the plate from the first portion to the rear of the plate, said chamber having a given depth below said plate, said passageway having a depth below said plate substantially less than said given depth, the wall forming the front of the chamber slanting downwardly and rearwardly, the wall forming the back of the chamber being approximately vertical with the bottom thereof above the bottom of said front wall of the chamber, and the wall forming the bottom of the chamber slanting upwardly and rearwardly from the bottom of the front wall to the bottom of the rear wall, said bottom of the chamber having an opening therethrough approximately in the front-to-back middle thereof which opening extends approximately the length of the chamber for the admission of secondary air; and gas burner means adjacent the bottom of the chamber for producing a flame in the chamber and extending approximately the length thereof, which flame is spaced from the plate and has sides spaced from the forward and back sides of the chamber whereby gases can circulate in the chamber at the front and back sides of the flame between the flame and the chamber walls, said burner means directing said flame toward the area of the plate adjacent the front thereof, said burner means being directed upwardly through said opening in the chamber bottom and generally toward an area adjacent the front of the plate.

13. In an apparatus as set forth in claim 12, wherein the vertical depth of said passageway is no greater than 40 percent of the depth of said chamber.

14. In an apparatus as set forth in claim 1, wherein the vertical depth of said passageway is no greater than 40 percent of the depth of said chamber.

15. In a cooking apparatus comprising an approximately horizontal, approximately flat plate to be heated and forming a cooking surface, said plate having a front and a back, and a device to heat said plate, the improvement comprising:

walls extending downwards and across below said plate and defining a combustion chamber communicating with an exhaust passageway, said chamber and passageway extending the length of said plate with the top of the chamber and passageway being defined by said plate, said chamber being below a first portion of the plate extending rearwardly from the front thereof and the passageway being below the remaining portion of the plate from the first portion to the rear of the plate, said chamber having a given depth below said plate, said passageway having a depth below said plate substantially less than said given depth, said chamber having space at the bottom to receive said device and being substantially unobstructed between said space and said plate; and said device including gas burner means in said space for producing a flame in the chamber and extending approximately the length thereof, which flame is spaced form the plate and has sides spaced from the forward and back sides of the chamber whereby gases can circulate in the chamber at the front and back sides of the flame between the flame and the chamber walls, said burner means directing said flame toward the area of the plate adjacent the front thereof.

16. In an apparatus as set forth in claim 15, wherein the front to back dimension of said first portion of said plate is between 0.25 and 0.66 of the front to back dimension of said plate.

17. In an apparatus as set forth in claim 16, wherein the vertical depth of said passageway is no greater than 40 percent of the depth of said chamber.

18. In a cooking apparatus comprising an approximately horizontal, approximately flat plate to be heated and forming a cooking surface, said plate having a front and a back, and a device to heat said plate, the improvement comprising:

walls extending downwards and across below said plate and defining a combustion chamber communicating with an exhaust passageway, said chamber and passageway extending the length of said plate with the top of the chamber and passageway being defined by said plate, said chamber being below a first portion of the plate extending rearwardly from the front thereof and the passageway being below the remaining portion of the plate from the first portion to the rear of the plate, said chamber having a given depth below said plate, said passageway having a depth below said plate substantially less than said given depth, the front-to-back dimension of said first portion of said plate being between 0.25 and 0.66 of the front-to-back dimension of said plate, the vertical depth of said passageway being no greater than 40 percent of the depth of said chamber, the wall forming the front of the chamber slanting downwardly and rearwardly, the wall forming the back of the chamber being approximately vertical with the bottom thereof above the bottom of said front wall of the chamber, and the wall forming the bottom of the chamber slanting upwardly and rearwardly from the bottom of the front wall to the bottom of the rear wall, said bottom of the chamber having an opening therethrough approximately in the front-to-back middle thereof which opening extends approximately the length of the chamber for the admission of secondary air; and gas burner means adjacent the bottom of the chamber for producing a flame in the chamber and extending approximately the length thereof, which flame is spaced from the plate and has sides spaced from the forward and back sides of the chamber whereby gases can circulate in the chamber at the front and back sides of the flame between the flame and the chamber walls, said burner means directing said flame toward the area of the plate adjacent the front thereof, said burner means being directed upwardly through the opening in the chamber bottom and generally toward said first portion of the plate.

19. In a cooking apparatus comprising an approximately horizontal, approximately flat plate to be heated and forming a cooking surface, said plate having a front and a back, and a device to heat said plate, the improvement comprising:

walls extending downwards and across below said plate and defining a combustion chamber communicating with an exhaust passageway, said chamber and passageway extending the length of said plate with the top of the chamber and passageway being defined by said plate, said chamber being below a first portion of the plate extending rearwardly from the front thereof, and the passageway being below the remaining portion of the plate from the first portion to the rear of the plate, said chamber having a given depth below said plate, said passageway having a depth below said plate substantially less than said given depth, the wall forming the front of the chamber slanting downwardly and rearwardly, the wall forming the back of the chamber being approximately vertical with the bottom thereof above the bottom of said front wall of the chamber, and the wall forming the bottom of the chamber slanting upwardly and rearwardly from the bottom of the front wall to the bottom of the rear wall, said bottom of the chamber having an opening therethrough approximately in the front-to-back middle thereof which opening extends approximately the length of the chamber for the admission of secondary air; and gas burner means adjacent the bottom of the chamber for producing a flame in the chamber and extending approximately the length thereof, which flame is spaced from the plate and has sides spaced from the forward and back sides of the chamber whereby gases can circulate in the chamber at the front and back sides of the flame between the flame and the chamber walls, said burner means directing said flame toward the area of the plate adjacent the front thereof, said burner means being directed upwardly through said opening in the chamber bottom and generally towards said first portion of the plate.

20. In a cooking apparatus comprising an approximately horizontal, approximately flat plate to be heated and forming a cooking surface, said plate having two pairs of opposed sides, a device to heat said plate, and housing means extending downwardly from said plate, the improvement comprising:

said housing means and said plate defining a two-part enclosure below said plate comprising a combustion chamber communicating with an exhaust gas passageway, said plate being the top of said chamber and passageway, said housing means defining an exhaust gas outlet immediately below said plate and at one of said sides of one pair, said chamber being positioned at the other of the sides of said one pair and extending from said other side toward said one side, said passageway extending from said combustion chamber to said one side, at the underside of said plate said chamber and passageway extending substantially between the two sides of the other pair of sides, the dimension of said chamber, as measured along a line parallel to the distance between said sides of said one pair, being between 0.25 and 0.66 of said distance between said sides of said one pair, said chamber having one downwardly extending wall having an upper end at said other side and a second downwardly extending wall having an upper end at the bottom of said passageway and being approximately parallel to said other side, said passageway having a vertcial depth below said plate that is no greater than forty percent of the vertical depth of the chamber below said plate;

said device comprising gas burner means extending across the bottom of said chamber approximately from a first side to approximately the second side of said other pair of sides, said burner means being approximately midway between said walls, said burner means being constructed and arranged for producing upwardly extending jets of flame spaced from said walls and spaced from the underside of said plate.

21. In a cooking apparatus as set forth in claim 20, wherein said gas burner means includes a gas manifold extending parallel to said walls, and a plurality of Bunsen burners connected to said pipe, said burners being positioned at spaced intervals generally in a line approximately parallel to said walls, said burners being directed upwardly toward said plate, and a flame holder over each of the burners and substantially below said plate;

said chamber defines opening means adjacent said burners for the admission of air to the area about the burners.

22. In a cooking apparatus as set forth in claim 21, including heat transfer means in heat conductive relationship with the bottom of the plate and extending downwardly therefrom for increasing the heat transfer from the gases of combustion to specific parts of the plate for rendering the temperature of the plate more uniform particularly adjacent the sides of the plate.

References Cited

UNITED STATES PATENTS

| 1,287,405 | 12/1918 | O'Dowd | 126—39 |
| 2,633,120 | 3/1953 | Wernheim | 126—15 X |
| 3,241,542 | 3/1966 | Lotter | 126—39 |

EDWARD G. FAVORS, Primary Examiner

U.S. Cl. X.R.

126—211